United States Patent
Walker et al.

(10) Patent No.: US 7,835,692 B2
(45) Date of Patent: Nov. 16, 2010

(54) COMMUNICATION SYSTEM AND METHOD OF RECEIVING HIGH PRIORITY SIGNALS AND LOW PRIORITY SIGNALS

(75) Inventors: Glenn A. Walker, Greentown, IN (US); Eric A. Dibiaso, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 699 days.

(21) Appl. No.: 11/895,796

(22) Filed: Aug. 27, 2007

(65) Prior Publication Data

US 2009/0059783 A1 Mar. 5, 2009

(51) Int. Cl.
*H04Q 7/20* (2006.01)

(52) U.S. Cl. ............ 455/12.1; 455/11.1; 455/13.1; 455/3.01; 455/3.02; 455/426.1; 725/62; 725/63; 725/70; 725/68; 370/310; 370/316; 370/322; 370/343; 370/328

(58) Field of Classification Search ......... 455/12.1, 455/11.1, 13.1, 427, 13.3, 428, 429, 3.01, 455/3.02, 422.1, 403, 550.1, 500, 517, 426.1, 455/426.2; 725/62–72; 370/310, 316, 322, 370/328, 329, 343
See application file for complete search history.

(56) References Cited

U.S. PATENT DOCUMENTS 7,209,524 B2    4/2007    Chen

FOREIGN PATENT DOCUMENTS

EP    1024609 A2  *  8/2000
GB    2388747 A   *  11/2003

OTHER PUBLICATIONS

Chuberre, Nicolas, and Courseille, Olivier, "Mobile TV to Handheld Via Hybrid Satellite/Terrestrial Network," pp. 107-112.

* cited by examiner

*Primary Examiner*—Keith T Ferguson
(74) *Attorney, Agent, or Firm*—Jimmy L. Funke

(57) ABSTRACT

A communication system and method of communicating signals to a plurality of different types of receivers is provided. The communication system includes at least one transmitter that transmits a high priority signal and a low priority signal that are hierarchically modulated and transmitted as a single frequency network. At least one satellite receives and re-transmits at least one of the high priority and low priority signals. At least one of the plurality of receivers include a processor that performs the steps of storing the hierarchically modulated signal, demodulating the high priority signal from the hierarchically modulated signal, decoding the demodulated high priority signal, re-encoding the high priority signal, and processing the stored hierarchically modulated signal based upon the re-encoded high priority signal.

20 Claims, 8 Drawing Sheets

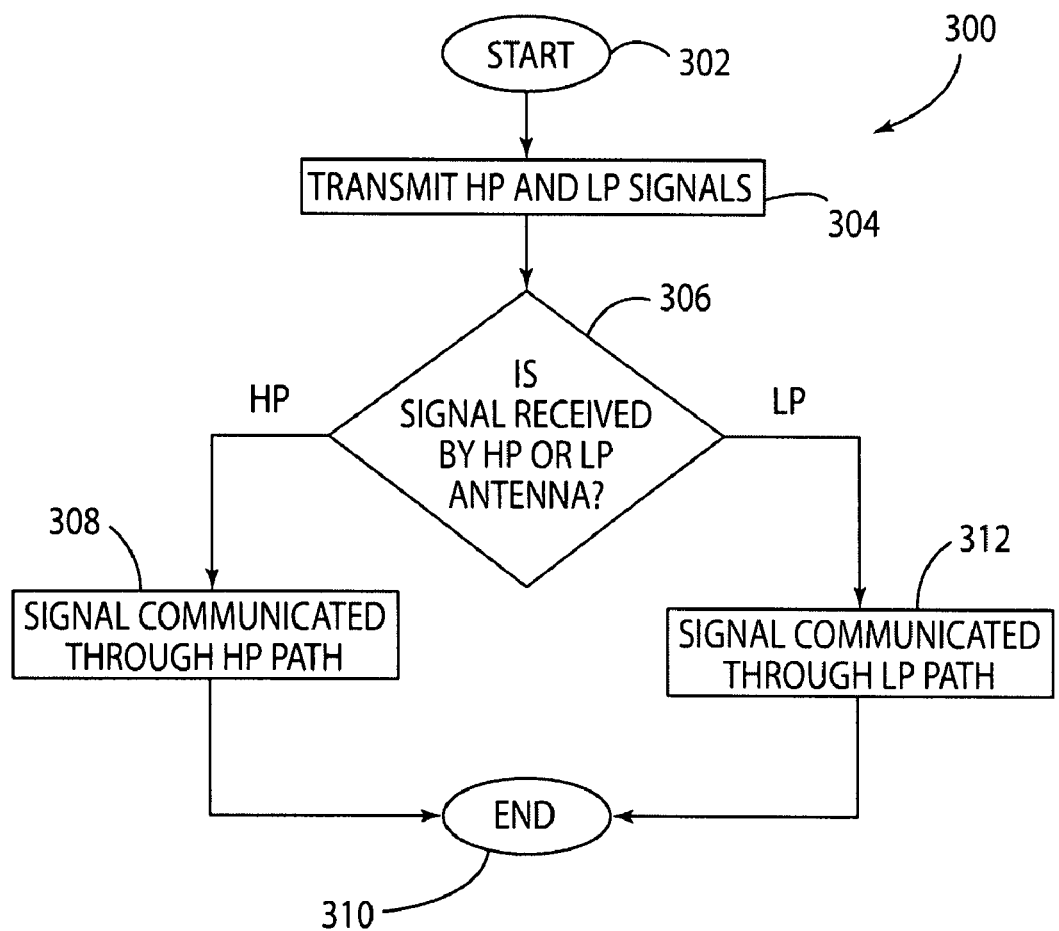

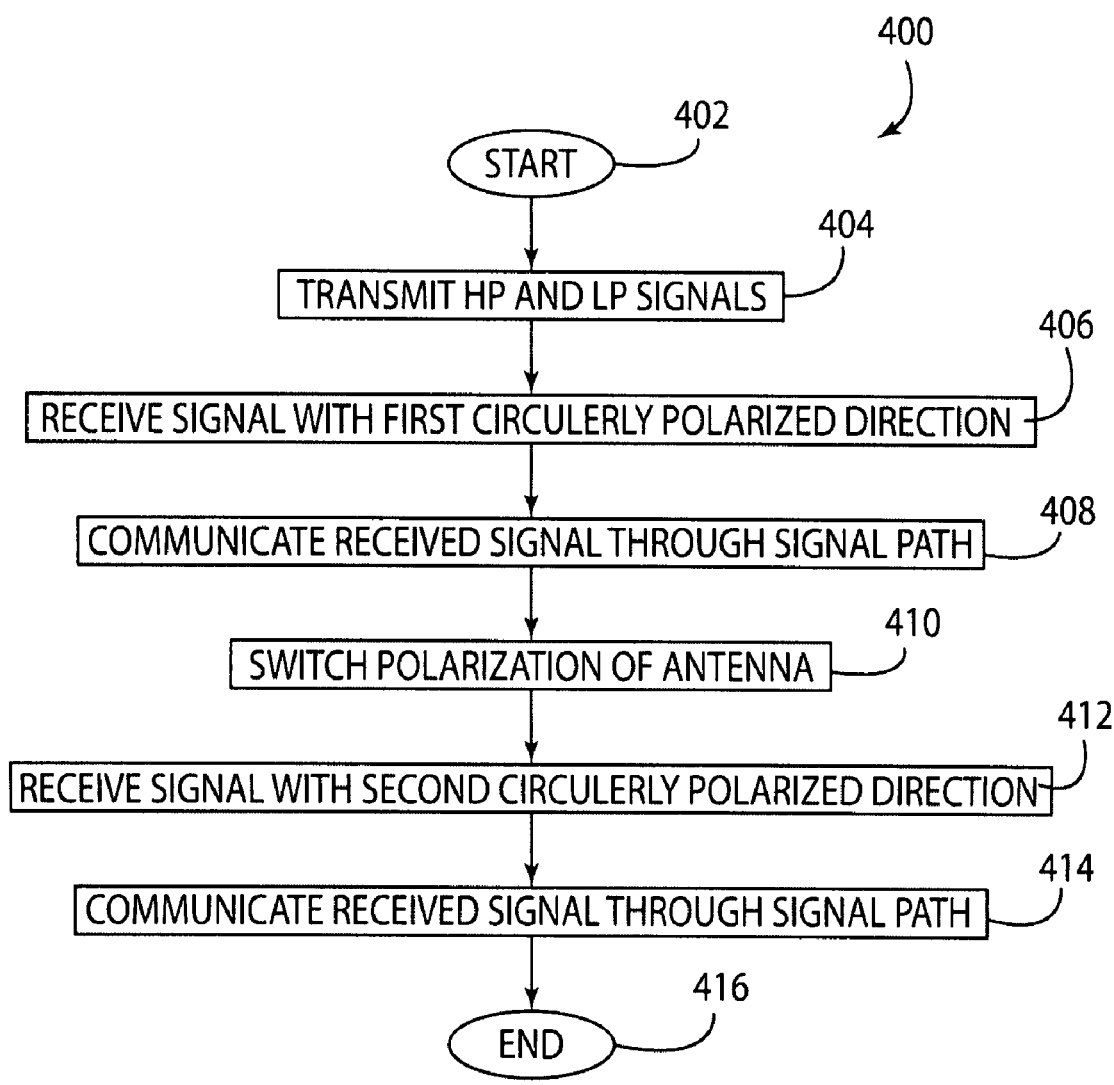

COMMUNICATION SYSTEM AND METHOD OF RECEIVING HIGH PRIORITY SIGNALS AND LOW PRIORITY SIGNALS

TECHNICAL FIELD

The present invention generally relates to a communication system and method, and more particularly, to a communication system and method of receiving high priority signals and low priority signals.

BACKGROUND OF THE DISCLOSURE

Generally, vehicles can be equipped with satellite radio receivers as an alternative to, or in combination with, common traditional terrestrial radio receivers. Additionally, satellite radio receivers can be used in places other than vehicles, such as handheld devices. Generally, satellite radio systems are designed, such that the receiver receives a satellite radio frequency (RF) signal from a satellite and a terrestrial RF signal from a terrestrial repeater or a transponder, which typically provides system redundancy.

The current systems in operation in the U.S. generally use double redundant information to enable high signal availability to receivers.

These systems typically use time and space redundancy for the satellite signals, such that the signal is transmitted from two sources. Typically, in urban areas, terrestrial repeaters can provide a third signal source. Generally, such systems use different frequencies for the satellite signal and the terrestrial repeater signal. This architecture generally reduces the bandwidth efficiency of the system by one-third (⅓), while increasing overall availability.

Due to current European regulations, one European satellite radio system has proposed generally using three (3) frequency bands that are five mega-hertz (5 MHz) wide around 2170 MHz and 2185 MHz. Generally, such a system proposes using a single frequency network for satellite and terrestrial components, such that the satellite signal is the same frequency as the terrestrial signal.

SUMMARY OF THE INVENTION

According to one aspect of the present invention, a communication system includes at least one transmitter, at least one satellite, and a plurality of receivers. The at least one transmitter transmits a high priority signal and a low priority signal, wherein the high priority and low priority signals are hierarchically modulated and transmitted as a single frequency network. The at least one satellite is in communication with the at least one transmitter, and receives from the at least one transmitter and re-transmits the high priority and low priority signals. The plurality of receivers are in communication with the at least one satellite, and at least one of the plurality of receivers include a processor that performs the steps of storing the hierarchically modulated signal, and demodulating the high priority signal from the hierarchically modulated signal. The processor further performs the steps of decoding the demodulated high priority signal, re-encoding the high priority signal, and processing the stored hierarchically modulated signal based upon the re-encoded high priority signal.

According to another aspect of the present invention, a method of communicating signals to a plurality of different types of receivers includes the steps of transmitting a high priority signal and a low priority signal as a single frequency network, wherein the high priority signal and low priority signal are hierarchically modulated, and receiving the hierarchically modulated signal, where a first receiver of the plurality of different types of receivers is configured to receive the high priority signal and the low priority signal. The method further includes the steps of storing the hierarchically modulated signal, demodulating the high priority signal from the hierarchically modulated signal, decoding the demodulated high priority signal, re-encoding the high priority signal, and processing the stored hierarchically modulated signal based upon the re-encoded high priority signal.

According to yet another aspect of the present invention, a method of communicating a signal to a plurality of different types of receivers includes the steps of modulating a high priority signal and a low priority signal, wherein the high priority and low priority signals are quadrature phase-shift keying (QPSK) modulated, and transmitting the high priority signal and low priority signal as a single frequency network, where the high priority signal and low priority signal are hierarchically modulated and orthogonal frequency-division multiplexed (OFDM). The method further includes the steps of receiving the hierarchically modulated signal, with a first receiver of the plurality of different types of receivers configured to receive the high priority signal and the low priority signal, storing the hierarchically modulated signal, and converting the analog hierarchically modulated signal to a digital signal. The method also includes the steps of estimating an amplitude shift and phase-shift of the hierarchically modulated signal by a channel estimator, demodulating the high priority signal from the hierarchically modulated signal, decoding the demodulated high priority signal, re-encoding the high priority signal, and removing the re-encoded high priority signal from the stored hierarchically modulated signal.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which:

FIG. 7 is a flow chart illustrating a method of receiving a high priority signal and a low priority signal by a receiver, in accordance with one embodiment of the present invention; and FIG. 8 is a flow chart illustrating a method of receiving a high priority and a low priority signal by a receiver, in accordance with an alternate embodiment of the present invention.

DESCRIPTION OF PREFERRED EMBODIMENTS

Figure 1:
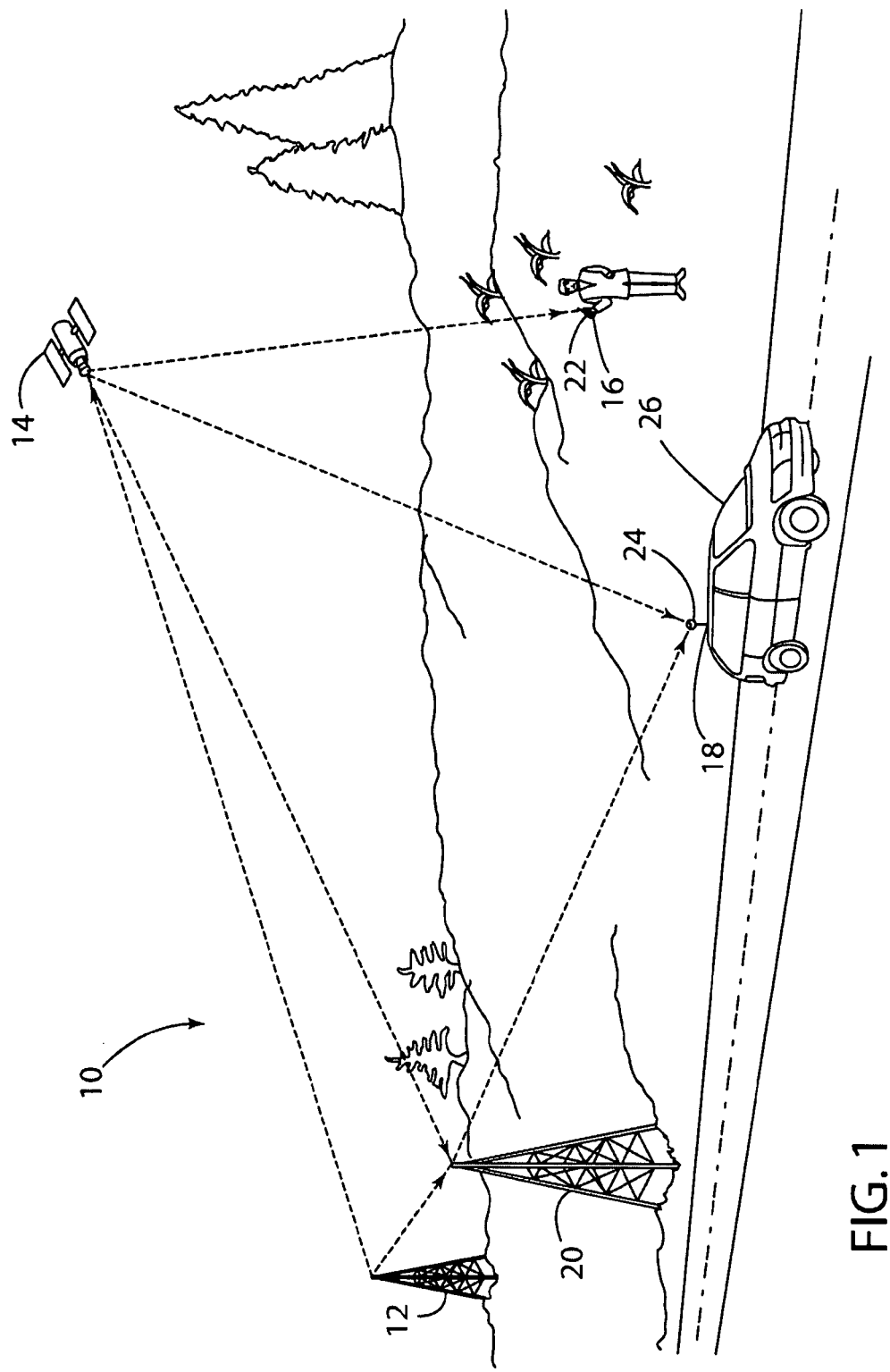
FIG. 1 is an environmental view of a communication system, in accordance with one embodiment of the present invention.
Figure 4:
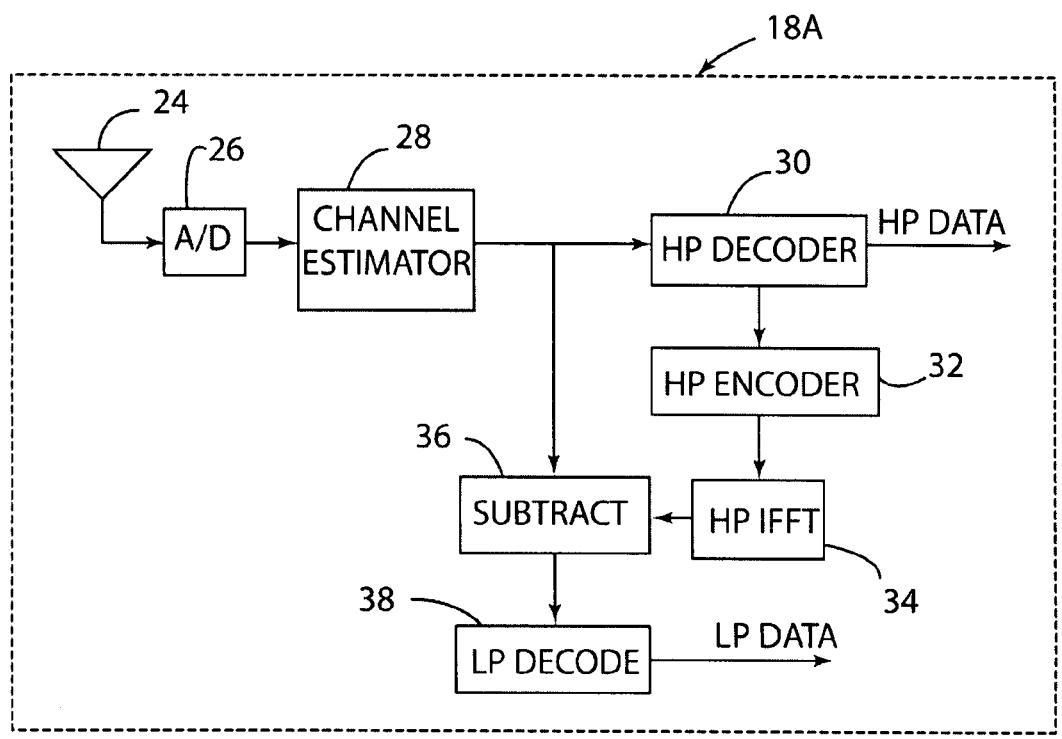
FIG. 4 is a block diagram of a receiver configured to receive a high priority signal and a low priority signal, in accordance with one embodiment of the present invention.
Figure 6:
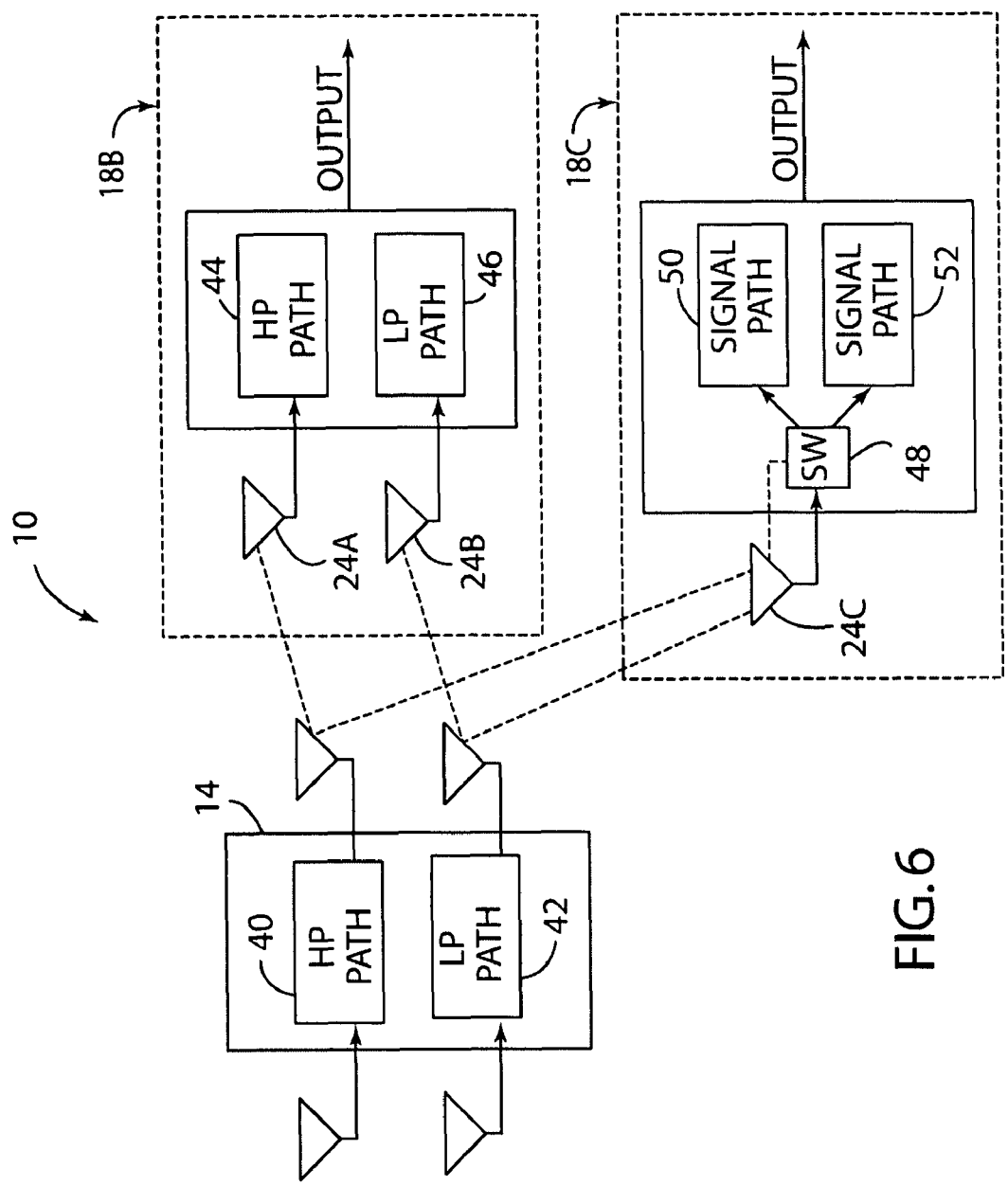
FIG. 6 is a block diagram of a communication system, including a receiver configured to receive a high priority signal and a low priority signal, in accordance with one embodiment of the present invention, and another receiver configured to receive a high priority signal and low priority signal, in accordance with an alternate embodiment of the present invention.

In reference to FIG. 1, a communication system is generally shown at reference identifier 10. The communication system 10 includes at least one transmitter 12 that transmits a high priority (HP) signal and a low priority (LP) signal as a single frequency network, which is indicated by a single line extending from the transmitter 12. The communication system 10 also includes at least one satellite 14 and a plurality of receivers, wherein at least a portion of the plurality of receivers are different types of receivers including at least a first receiver 16 and a second receiver 18. The satellite 14 is in communication with the transmitter 12, such that the satellite 14 receives from the transmitter 12 and re-transmits the high priority and low priority signals. According to one embodiment, the satellite 14 is a geostationary (GEO) satellite. The first receiver 16 is configured to process the high priority signal, and the second receiver 18 is configured to process the high priority signal and low priority signal, as described in greater detail herein. Exemplary embodiments of the second receiver are shown in FIGS. 4 and 6 at reference identifier 18A, 18B, 18C, wherein the second receiver is not limited to such embodiments.

According to one embodiment, a terrestrial repeater 20 is in communication with at least a portion of the plurality of receivers and the transmitter 12, such that the terrestrial repeater 20 receives and re-transmits at least one of the high priority signal and the low priority signal typically as a terrestrial radio frequency (RF) signal. According to one embodiment, the terrestrial repeater 20 receives and re-transmits at least one of the high priority and low priority signals from the transmitter 12. According to an alternate embodiment, the terrestrial repeater 20 receives and re-transmits at least one of the high priority and low priority signals from the satellite 14.

According to one embodiment, the terrestrial repeaters 20 are gap fillers, such that the signal re-transmitted by the terrestrial repeater 20 provides a signal at locations where the signals re-transmitted by the satellite 14 are blocked. Thus, the high priority signal and low priority signal are being transmitted in spatial diversity to increase the probability that one of the plurality of receivers receives the signals. Generally, signals are transmitted in spatial diversity when the angles the plurality of receivers receive the transmitted signals differ, such as the differing receive angles of the signals when the plurality of receivers receive a signal from the satellite 14 and a signal from the terrestrial repeater 20. It should be appreciated by those skilled in the art that any number of terrestrial repeaters 20 can be in communication between at least a portion of the plurality of receivers and the transmitter 12.

According to a disclosed embodiment, the high priority signal and low priority signals are orthogonal frequency-division multiplexed (OFDM) in order to be transmitted as a single frequency network. Generally, a single frequency network is where multiple transmitters transmit the same signal over the same frequency, and reduce the number of frequencies being used, since each transmitter is not transmitting at different frequencies. Thus, the satellite 14 and terrestrial repeater 20 can re-transmit the high priority and low priority signals as substantially the same OFDM signal at substantially the same frequency without the signal transmitted from the satellite 14 affecting the signal transmitted from the terrestrial repeater 20 and vice versa. Transmitting the high priority and low priority signals as a single frequency network can increase the coverage area, such as where the plurality of receivers can receive the signals, and increase the signal strength of the received signals, depending upon the location of each of the plurality of receivers receiving the signals with respect to the satellite 14 and terrestrial repeater 20. For purposes of explanation and not limitation, when transmitting the high priority and low priority signals as a single frequency network, the transmission power of the satellite 14 may be backed off to reduce distortion, such as a three decibel (3 dB) output power back off, due to multiple signals being transmitted at substantially the same frequency, according to one embodiment.

Figure 2:
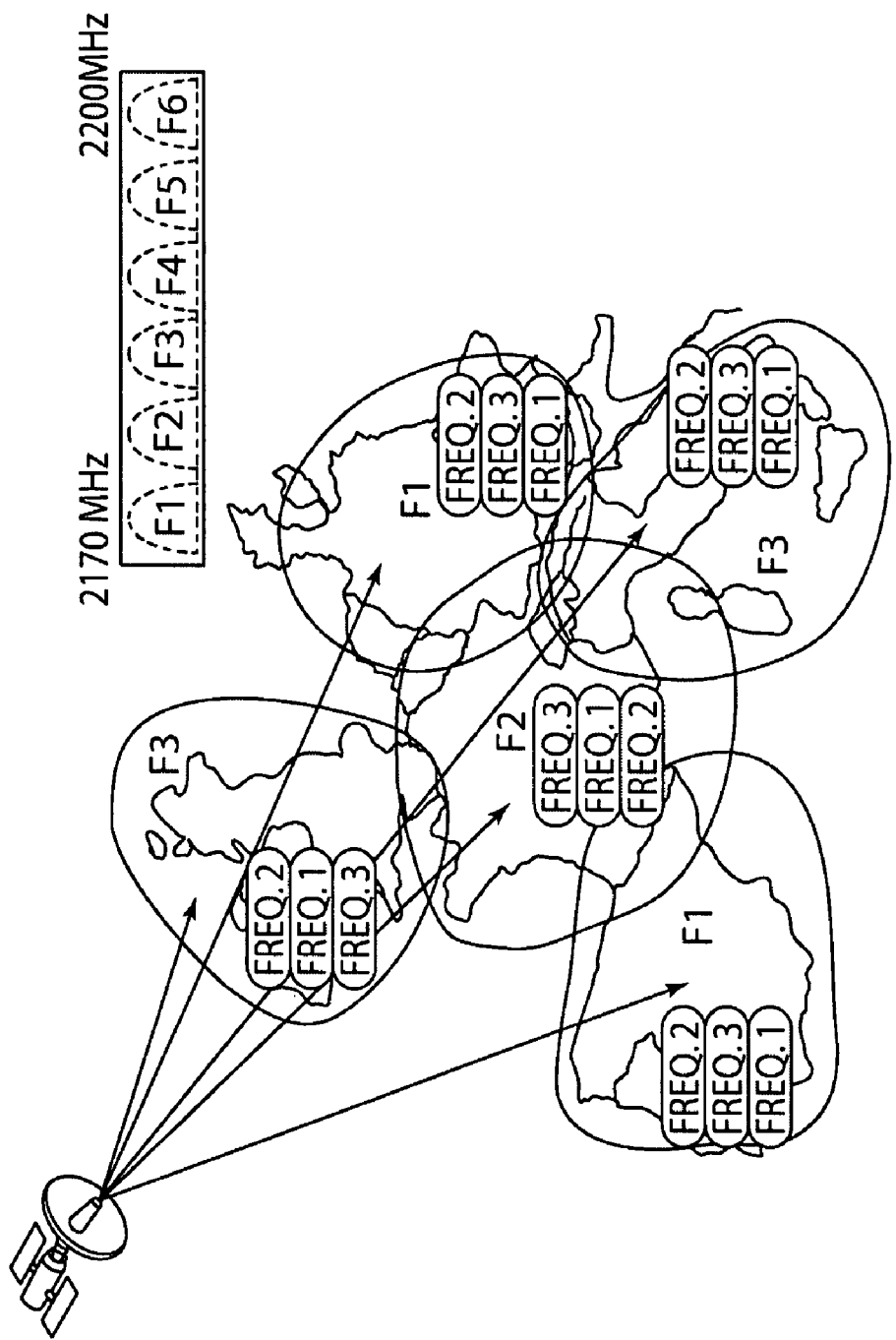
FIG. 2 is an environmental view illustrating exemplary spot beams of a satellite, in accordance with one embodiment of the present invention.

By way of explanation and not limitation with regards to FIG. 2, there are three (3) spot beams covering the western portion of the European continent. In spot beams F1, the satellite 14 and terrestrial repeater 20 re-transmit the high priority and low priority signals at substantially the same frequency (Freq. 1), and the terrestrial repeater 20 also re-transmits the signals at a second frequency (Freq. 2) and third frequency (Freq. 3). Similarly, in spot beam F2, the satellite 14 and the terrestrial repeater 20 re-transmit the high priority and low priority signals at substantially the same frequency (Freq. 2), and the terrestrial repeater 20 also re-transmits the signals at the first frequency (Freq. 1) and third frequency (Freq. 3). Thus, the high priority and low priority signals can be transmitted in spatial and time diversity.

With respect to FIG. 1, according to one embodiment, the high priority signal is quadrature phase-shift keying (QPSK) modulated, and the high priority and low priority signals are hierarchically modulated. The high priority signal can be QPSK modulated when being transmitted on a multi-carrier waveform, such as when the high priority and low priority signals are in an OFDM format, according to a disclosed embodiment. Thus, the high priority signal can be configured, such that the first and second receivers 16,18 receive the high priority signal, and the low priority signal can be configured, such that only the second receiver 18 receives the low priority signal. Additionally, the high priority and low priority signals can be transmitted in time diversity, such as, but not limited to, by having a forward error correction (FEC) rate of one-third (⅓), according to one embodiment.

Typically, the first receiver 16 includes a first antenna 22 configured to receive the high priority signal, and the receiver 18 includes a second antenna 24 configured to receive the high priority signal and the low priority signal, according to one embodiment. Alternatively, the first antenna 22 receives both the high priority and low priority signals, wherein the low priority signal appears as noise to the first receiver 16, since the first receiver 16 is configured to process the high priority signal, according to one embodiment. It should be appreciated by those skilled in the art that the antenna 22,24 configuration can also include the circuitry and/or processors having one or more software routines that are in communication with the antenna 22,24.

According to a disclosed embodiment, the first receiver 16 is a handheld receiver, and the second receiver 18 is a mobile receiver, such as a receiver used with a vehicle 26. Since the second receiver 18 is used with another device, such as the vehicle 26, the second receiver 18 can generally include additionally circuitry that is not included in the first receiver 16, so that the second receiver 18 can receive both the high priority and the low priority signals to increase the quality of the second receiver's 18 output, as described in greater detail herein. Further, since the first receiver 16 only processes the high priority signal, the circuitry for receiving and processing the signal and the power consumption are reduced when compared to the second receiver 18.

According to one embodiment, the high priority signal has greater protection than the low priority signal, such that the high priority signal is higher protected in both FEC and modulation performance. Typically, the low priority signal has reduced protection in both FEC and modulation, when compared to the higher priority signal, but the low priority signal has increased time diversity to increase the probability of the signal being received by the second receiver 18 when mobile. According to one embodiment, the low priority data is an enhancement to the high priority data, such that the high priority signal is adequate to produce an output by the first and second receivers 16,18, but the configuration of the second antenna 24 and increased circuitry of the second receiver 18, which allows for the low priority signal to be received, increases the quality of the output signal emitted by the second receiver 18 based upon the received high priority and low priority signals. By way of explanation and not limitation, the second receiver 18 can emit a video output that is displayed on a screen at a higher resolution than the first receiver 16 due to the low priority signal being an enhancement of the high priority signal.

Figure 3:
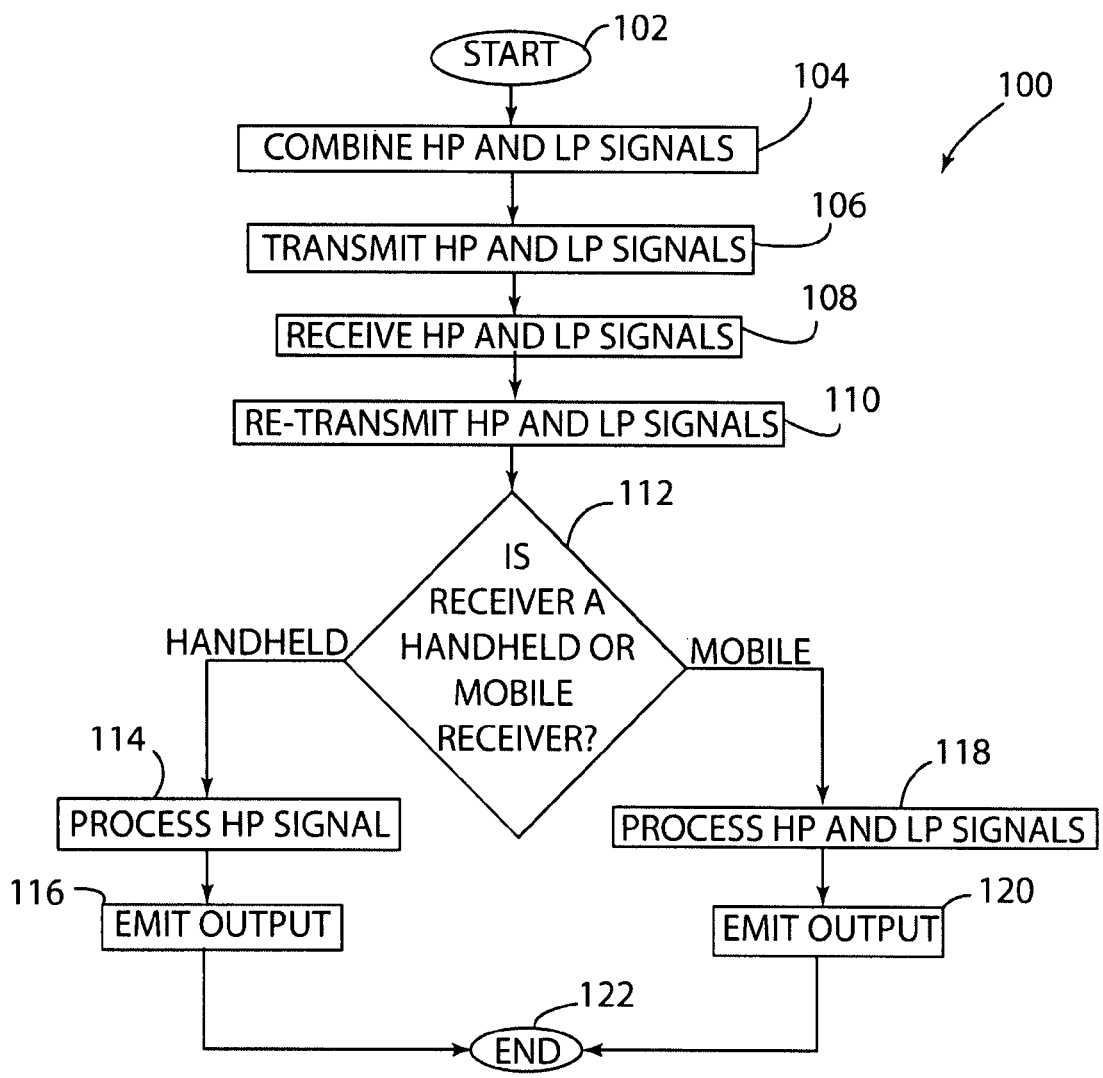
FIG. 3 is a flow chart illustrating a method of communicating a signal to a plurality of different types of receivers, in accordance with one embodiment of the present invention.

Referring to both FIGS. 1 and 3, a method of communicating a signal to a plurality of different types of receivers is generally shown in FIG. 3 at reference identifier 100. The method 100 starts at step 102, and proceeds to step 104, where the high priority and low priority signals are combined, such that the high priority and low priority signals are transmitted as a single frequency network. According to one embodiment, the high priority and low priority signals are multiplexed in an OFDM format. At step 106, the high priority and low priority signals are transmitted by the transmitter 12. The high priority and low priority signals are received by the satellite 14 at step 108, and at step 110, the satellite 14 re-transmits the high priority and low priority signals. Typically, the signals are transmitted by the transmitter 12, and re-transmitted by the satellite 14 or the satellite 14 and terrestrial repeater 20 as a single frequency network.

At decision step 112, it is determined if the receiver is a handheld receiver 16 or mobile receiver 18. According to one embodiment, the type of receiver 16,18 is determined based upon the antenna configuration and/or processing circuitry of the receiver 16,18, such that the receiver 16,18 is either configured to process the high priority signal (receiver 16) or both the high priority and low priority signals (receiver 18). If it is determined at decision step 112 that the receiver is a handheld receiver, such as receiver 16, then the method 100 proceeds to step 114, where the receiver 16 processes the high priority signal. At step 116, the receiver 16 emits an output based upon the high priority signal, and the method 100 then ends at step 122. However, if it is determined at decision step 112 that the receiver is a mobile receiver, such as receiver 18, then the method 100 proceeds to step 118, where the high priority and low priority signals are processed by the mobile receiver 18. The receiver 18 emits an output at step 120 based upon the high priority and low priority signals, and thereafter the method 100 ends at step 122.

According to one embodiment shown in FIG. 4, the second receiver is generally identified at reference identifier 18A. The second receiver 18A includes a second antenna 24 and an analog-to-digital (A/D) converter 26, which converts the analog high priority and low priority signals received by the second antenna 24 to a digital signal. The digital signal is then communicated from the A/D converter 26 to a channel estimator 28. According to a disclosed embodiment, the channel estimator 28 forms an estimate of amplitude and phase-shift from available pilot information in order to remove amplitude and phase-shift of the received high priority and low priority signals.

A high priority decoder 30 is in communication with the channel estimator 28, such that the high priority decoder 30 decodes the high priority signal from the signal received by the second antenna 24 and processed by the channel estimator 28. The decoded high priority signal is then communicated from the high priority decoder 30 to a high priority encoder 32, which re-encodes the decoded high priority signal. The re-encoded high priority signal is communicated from the high priority encoder 32 to a high priority inverse fast Fourier transform (HP IFFT) device 34. Typically, the HP IFFT device 34 can also perform a non-linear estimate of the transmission power amplification characteristics for the re-encoded high priority signal. The output from the HP IFFT device 34 is then communicated to a device 36, which also receives the output from the channel estimator 28. The device 36 subtracts the re-encoded high priority signal from the signal communicated from the channel estimator 28 that contains the high priority and low priority signals received from the antenna 24. The output of the device 36 contains the low priority signal, and is communicated to a low priority decoder 38. The low priority decoder 38 can decode the low priority signal. Since both the high priority data and low priority data are decoded, such that the decoded high priority data is communicated from the high priority decoder 30, and the decoded low priority data is communicated from the low priority decoder 38, the second receiver 18A can emit an output signal based upon the high priority and the low priority signals. It should be appreciated by those skilled in the art that the above devices of the second receiver 18A can be electrical circuitry, processors with one or more software routines, or a combination thereof in order to process and decode the high priority and low priority signals received by the second antenna 24.

Figure 5:
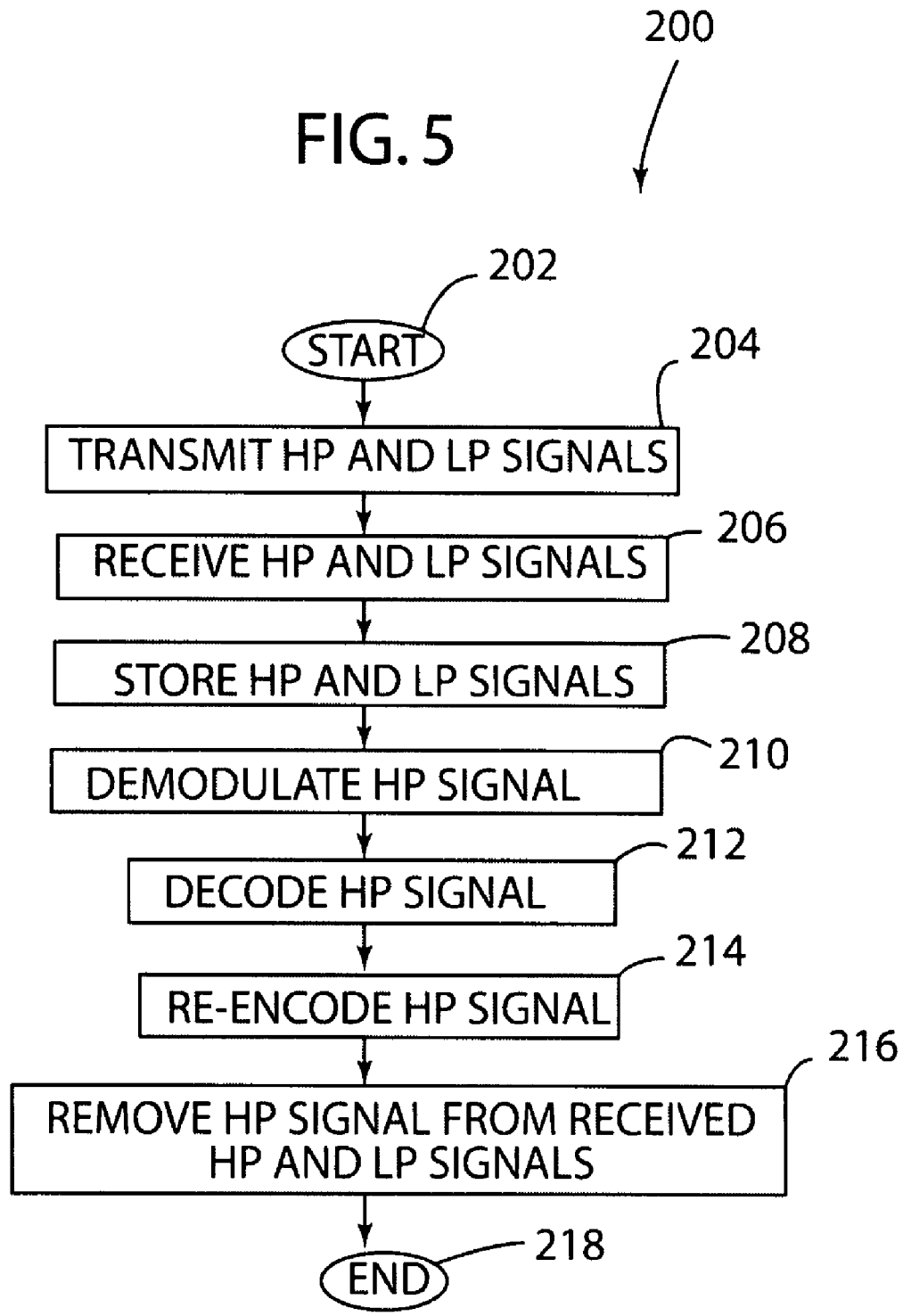
FIG. 5 is a flow chart illustrating a method of receiving a high priority signal and a low priority signal, in accordance with one embodiment of the present invention.

In reference to both FIGS. 4 and 5, a method of communicating a signal to a plurality of different types of receivers is generally shown in FIG. 5 at reference identifier 200. The method 200 starts at step 202, and proceeds to step 204, where high priority and low priority signals are transmitted by the transmitter 12. In step 206, the second receiver 18A receives the high priority and low priority signals, and at step 208, the second receiver 18A stores the high priority and low priority signals.

According to an alternate embodiment, pre-distortion is added to the low priority signal when the low priority signal is transmitted by the transmitter 12 in order to optimize the reception of the low priority signal by the second receiver 18A. Typically, signals that are multiplexed using an OFDM format have distortion when the peak-to-average ratio is limited. This can occur when the satellite 14 transmits the signals, since the power back-off of the satellite 14 is generally limited due to attempting to maximize the equivalent isotropically radiated power (EIRP) from the satellite 14. Generally, EIRP is the amount of power an antenna must emit in order to produce peak power density in the direction of maximum antenna gain. According to one embodiment, in order to receive a hierarchically modulated signal from the satellite 14, the pre-distortion is caused by soft clipping the OFDM signal at the receiver 12.

At step 210, the second receiver 18A demodulates the high priority signal. The second receiver 18A then decodes the high priority signal at step 212, typically using the high priority decoder 30. The high priority signal is then re-encoded at step 214, using the high priority encoder 32. At step 216, the re-encoded high priority signal is removed from the stored received high priority and low priority signals. Typically, the removal of the re-encoded high priority signal is done using the device 36. The method 200 then ends at step 218. According to a disclosed embodiment, since the high priority signal is stronger than the low priority signal, the high priority signal can be decoded and re-encoded to produce a substantially non-distorted copy of the original high priority signal. Generally, the low priority signal appears to be noise with respect to the high priority signal. Thus, the re-encoded high priority signal can be used to produce the low priority signal from the stored high priority and low priority signals.

According to an alternate embodiment as shown in FIG. 6, the satellite 12 has a high priority path 40 and a low priority path 42. According to one embodiment, the high priority signal in the high priority path 40 is right-hand circularly polarized, and the low priority signal in the low priority path 42 is left-hand circularly polarized. However, it should be appreciated by those skilled in the art that the high priority signal can be left-hand circularly polarized, and the low priority signal can be right-hand circularly polarized.

According to one embodiment, the second receiver, generally indicated at 18B, has a high priority path 44 that corresponds with the high priority path 40 of the satellite 12, and first and second antennas 24A,24B. The first antenna 24A is a right hand circularly polarized antenna, and receives the high priority signal from the satellite 12, according to one embodiment. Additionally, the second receiver 18B has a low priority path 46 that corresponds to the low priority path 42 of the satellite 12, such that the low priority path 46 is in communication with the second antenna 24B, which in one embodiment is a left hand circularly polarized antenna, and receives the low priority signal from the satellite 12. Thus, the second receiver 18B receives both the high priority signal and the low priority signal substantially simultaneously, and emits an output based upon both signals. Typically, the first antenna 24A and second antenna 24B cross-polarize reject the signal of opposite polarization, such that the noise received by the antennas 24A, 24B is reduced. It should be appreciated by those skilled in the art that the second receiver 18B can include alternative or additional circuitry, processors with one or more software routines, or a combination thereof for processing the received high priority and low priority signals.

With regards to both FIGS. 6 and 7, a method of receiving high priority and low priority signals is generally shown in FIG. 7 at reference identifier 300. The method 300 starts at step 302, and proceeds to step 304, where the high priority and low priority signals are transmitted. Typically, the high priority and low priority signals are transmitted by the transmitter 12, and received and re-transmitted by the satellite 14. At decision step 306, it is determined if the signal being received is received by a high priority antenna, such as the first antenna 24A, or a low priority antenna, such as the second antenna 24B.

If it is determined at decision step 306 that the signal is being received by the high priority first antenna 24A, the signal is communicated through the high priority path 44 at step 308, and thereafter the method ends at step 310. However, if it is determined at decision step 306 that the signal is being received by the low priority second antenna 24B, then the method 300 proceeds to step 312, where the signal is communicated through the low priority path 46, and the method then ends at step 310. It should be appreciated by those skilled in the art that steps 308 and 312 can be performed substantially simultaneously, since the high priority signal is being received by a separate antenna than the low priority signal.

According to an alternate embodiment shown in FIG. 6, the second receiver, generally indicated at 18C, has a single antenna 24C and a switching device 48 in communication with the antenna 24C. Typically, the antenna 24C is capable of receiving a signal in one circularly polarized direction, such as receiving the high priority signal while the low priority signal generally appears as noise. The switching device 48 switches the polarization of the antenna 24C to receive both the high priority signal and the low priority signal at separate times, depending upon the polarization of the antenna 24C, since the high priority and low priority signals have different circularly polarized directions. For purposes of explanation and not limitation, the high priority signal is right-hand circularly polarized, such that the switching device 48 switches the antenna 24C to be right-hand circularly polarized to receive the high priority signal, and the low priority signal is left-hand circularly polarized, such that the switching device 48 switches the antenna 24C to be left-hand circularly polarized to receive the low priority signal. According to a disclosed embodiment, the antenna 24C can include a patch, such that different launch points, where the patch is connected to the antenna 24C, can be selected to create right-hand circular polarization, left-hand circular polarization, or linear polarization.

The high priority signal is received by the antenna 24C and passes through a high priority signal path 50, and the low priority signal is received by the antenna 24C and passes through a low priority signal path 52. Typically, the antenna 24C is configured to cross-polarize reject the signal of the opposite circularly polarized direction, and thus, achieve signal separation between the high priority signal and the low priority signal. An output is emitted by the second receiver 18C based upon the high priority signal, which passed through the first signal path 50 or the second signal path 52, depending upon the polarization of the antenna 24C. It should be appreciated by those skilled in the art that the second receiver 18C can include alternative or additional circuitry, processors with one or more software routines, or a combination thereof for processing the received high priority and low priority signals.

Since both the high priority and low priority signals are received by the second receiver 18C, the low priority signal is transmitted at a lower power than the high priority signal. The lower power of the low priority signal minimizes the interference the low priority signal causes in the reception of the high priority signal by the second receiver 18C.

With respect to FIGS. 1, 6, and 8, a method of receiving a high priority signal and a low priority signal is generally shown in FIG. 8 at reference identifier 400. The method 400 starts at step 402, and proceeds to step 404, where a high priority signal and a low priority signal are transmitted. Typically, the high priority and the low priority signals are transmitted by the transmitter 12, and re-transmitted by the satellite 14. At step 406, the antenna 24C receives the signal in the first circularly polarized direction, such as a right-hand circularly polarized signal. At step 408, the received signal is communicated through a signal path, such as signal path 50.

The method 400 proceeds to step 410, where the polarization of the antenna 24C is switched. According to one embodiment, the switching device 48 switches the polarization of the antenna 24C. At step 412, the antenna 24C receives the signal in the second circularly polarized direction, such as a left-hand circularly polarized signal. At step 414, the received signal is communicated through a signal path, such as signal path 52, and the method 400 ends at step 416.

According to one embodiment, the first antenna 22 on the first receiver 16 is a linearly polarized antenna, and at least the high priority signal re-transmitted by the terrestrial repeater 20 is linearly polarized. Thus, the first antenna 22 is configured to receive the linearly polarized high priority signal from the terrestrial repeater 20. Additionally or alternatively, the second antenna 24A, 24B, 24C on the second receiver 18A, 18B, 18C is circularly polarized, and the high priority and low priority signals are circularly polarized. Thus, the second antenna 24A, 24B, 24C is configured to receive the circularly polarized high priority and low priority signals re-transmitted by the satellite 14.

According to one embodiment, the low priority signal is multiplexed using the OFDM format. Typically, when the low priority signal is OFDM and has a different polarization direction than the high priority signal, the transmission power of the low priority signal from the satellite 14 is reduced or backed-off from the maximum available satellite 14 transmission power. The reduced transmission power of the low priority signal transmitted by the satellite 14 makes the low priority signal transmitted by the satellite 14 compatible with the low priority signal transmitted by the terrestrial repeater 20, which is typically transmitted as a terrestrial RF signal. Alternatively, when the low priority signal is a single carrier modulation or waveform, such as QPSK modulated, the low priority signal transmitted by the satellite 14 may not compatible with the low priority signal transmitted by the terrestrial repeater 20 as a terrestrial RF signal.

By way of explanation and not limitation, with regards to FIGS. 1-8, the first receiver 16 is typically used as a handheld device, and thus, receives and emits an output signal based upon the high priority signal. The second receiver 18 is typically a mobile device, such as a receiver used with the vehicle 26. Thus, the first receiver 16 generally uses less power and has less components when compared to the second receiver 18, since the output signal emitted by the first receiver 16 is based upon the high priority signal and not both the high priority and low priority signals. Additionally, the low priority signal is an enhancement of the high priority signal in that an output signal can be emitted based upon only the high priority signal but the addition of the low priority signal enhances or improves the quality of the output signal. For purposes of explanation and not limitation, if the emitted output signal is a video signal, then the second receiver 18 can emit an output signal having more pixels than the first receiver 16 due to receiving and processing the low priority signal in combination with the high priority signal.

Advantageously, the communication system 10 transmits a high priority signal and a low priority signal, and the plurality of receivers can be configured to receive either the high priority signal or both the high priority signal and the low priority signal. Thus, the signals received by each of the plurality of receivers is dependent upon the configuration of the receiver 16,18, and not the location of the receiver 16,18 with respect to the satellite 14 and terrestrial repeater 20. Since the low priority signal enhances the high priority signal, an adequate output can be emitted by a receiver 16 that only receives the high priority data while the output emitted by a receiver 18 based upon both the high priority and low priority signals is enhanced. Thus, a handheld device, such as the first receiver 16, can include the circuitry for receiving only the high priority data in order to reduce the size and power consumption of the receiver 16. Also, the receiver 18 that is integrated with another component, such as a vehicle 26, can include additional circuitry and have a higher power consumption, such that the receiver 18 can receive both the high priority and low priority signals in order to enhance the output emitted by the receiver. The satellite 14 and terrestrial transponder 20 can receive and re-transmit both the high priority and low priority signals, so that the infrastructure of the communication system 10 remains the same, and the signals received by the receiver are dependent upon the type of receiver that is being used. Further, the satellite 14 and terrestrial repeater 20 can transmit the high priority and low priority signals as a single frequency network so that the high priority and low priority signals do not adversely affect one another.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A communication system comprising:
   at least one transmitter that transmits a high priority signal and a low priority signal, wherein said high priority and low priority signals are hierarchically modulated and transmitted as a single frequency network;
   at least one satellite in communication with said at least one transmitter, wherein said at least one satellite receives from said at least one transmitter and re-transmits at least one of said high priority and said low priority signals; and
   a plurality of receivers in communication with said at least one satellite, wherein at least one of said plurality of receivers comprises a processor that performs the steps comprising:
   storing said hierarchically modulated signal;
   demodulating said high priority signal from said hierarchically modulated signal;
   decoding said demodulated high priority signal;
   re-encoding said high priority signal; and
   processing said stored hierarchically modulated signal based upon said re-encoded high priority signal.

2. The communication system of claim 1, wherein said step of processing said stored hierarchically modulated signal comprises removing said re-encoded high priority signal from said stored hierarchically modulated signal.

3. The communication system of claim 1, wherein said high priority and low priority signals are orthogonal frequency-division multiplexed (OFDM).

4. The communication system of claim 1, wherein said high priority and low priority signals are quadrature phase-shift keying (QPSK) modulated.

5. The communication system of claim 1, wherein said processor comprises a channel estimator that estimates an amplitude shift and phase shift of said hierarchically modulated signal.

6. The communication system of claim 1, wherein said processor comprises an analog-to-digital converter (A/D) that converts said analog hierarchically modulated signal to a digital signal.

7. The communication system of claim 1, wherein a second receiver of said plurality of receivers is used with a vehicle and configured to process said high priority signal and said low priority signal.

8. The communication system of claim 1, wherein a first receiver of said plurality of receives is a handheld device and configured to process said high priority signal.

9. A method of communicating signals to a plurality of different types of receivers, said method comprising the steps of:
  transmitting a high priority signal and a low priority signal as a single frequency network, wherein said high priority signal and said low priority signal are hierarchically modulated;
  receiving said hierarchically modulated signal, wherein a receiver of said plurality of different types of receivers is configured to process said high priority signal and said low priority signal;
  storing said hierarchically modulated signal;
  demodulating said high priority signal from said hierarchically modulated signal;
  decoding said demodulated high priority signal;
  re-encoding said high priority signal; and
  processing said stored hierarchically modulated signal based upon said re-encoded high priority signal.

10. The method of claim 9, wherein said step of processing said stored hierarchically modulated signal comprises removing said re-encoded high priority signal from said stored hierarchically modulated signal.

11. The method of claim 9 further comprising the step of orthogonal frequency-division multiplexing (OFDM) said high priority signal and said low priority signal.

12. The method of claim 9 further comprising the step of quadrature phase-shift keying (QPSK) modulating said high priority signal and said low priority signal.

13. The method of claim 9 further comprising the step of estimating an amplitude shift and phase shift of said hierarchically modulated signal by a channel estimator.

14. The method of claim 9 further comprising the step of converting said analog hierarchically modulated signal to a digital signal by an analog-to-digital converter (A/D).

15. The method of claim 9 further comprising the step of emitting an output based upon said high priority signal and said low priority signal by said receiver.

16. The method of claim 15, wherein said receiver is used with a vehicle.

17. The method of claim 9 further comprising the step of providing a receiver of said plurality of receivers that only processes said high priority signal.

18. A method of communicating signals to a plurality of different types of receivers, said method comprising the steps of:
  modulating a high priority signal and a low priority signal, wherein said high priority and said low priority signals are quadrature phase-shift keying (QPSK) modulated;
  transmitting said high priority signal and a low priority signal as a single frequency network, wherein said high priority signal and said low priority signal are hierarchically modulated and orthogonal frequency-division multiplexed (OFDM);
  receiving said hierarchically modulated signal, wherein a receiver of said plurality of different types of receivers is configured to receive said high priority signal and said low priority signal;
  storing said hierarchically modulated signal;
  converting said analog hierarchically modulated signal to a digital signal;
  estimating an amplitude shift and a phase shift of said hierarchically modulated signal by a channel estimator;
  demodulating said high priority signal from said hierarchically modulated signal;
  decoding said demodulated high priority signal;
  re-encoding said high priority signal; and
  removing said re-encoded high priority signal from said stored hierarchically modulated signal.

19. The method of claim 18 further comprising the step of emitting an output based upon said high priority signal and said low priority signal by said receiver.

20. The method of claim 18, wherein said receiver is used with a vehicle.

* * * * *